Warren & Damon.
Dynamometer.
N° 28,925.  Patented Jan. 26, 1860.
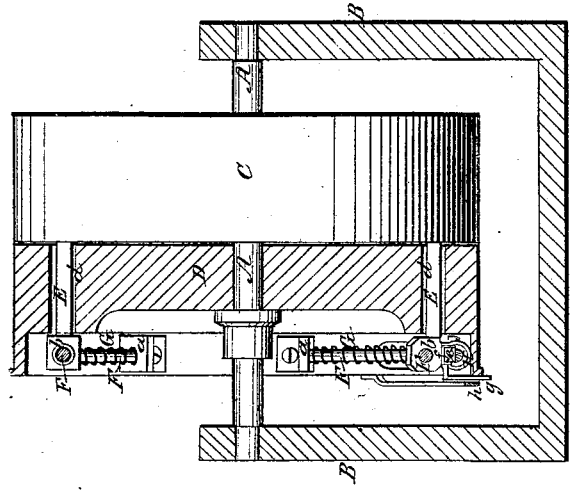
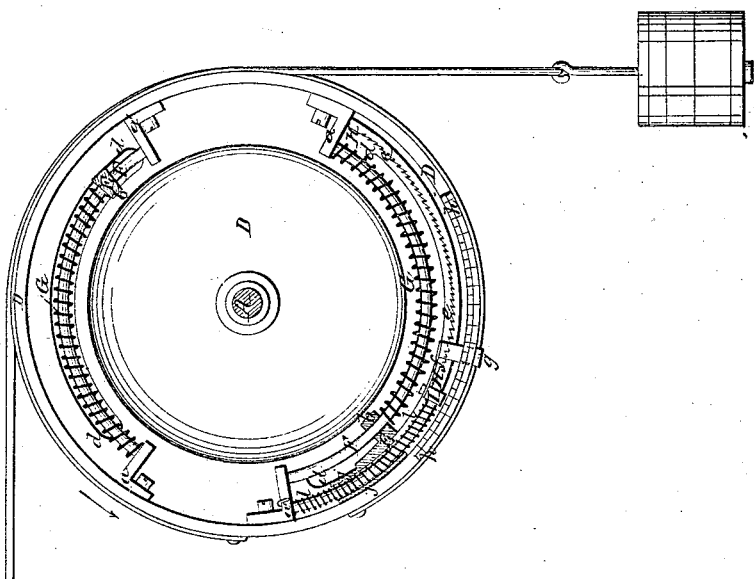
Witnesses
R. S. Spencer
J. W. Coombs.
Inventor
A. Warren.
E. Damon.
per Munn & Co.
Atty's

UNITED STATES PATENT OFFICE.

ALONZO WARREN AND E. DAMON, JR., OF BOSTON, MASSACHUSETTS.

DYNAMOMETER.

Specification of Letters Patent No. 28,925, dated June 26, 1860.

*To all whom it may concern:*

Be it known that we, ALONZO WARREN and ELIJAH DAMON, Jr., both of Boston, in the county of Suffolk and State of Massachusetts, have invented a new and Improved Dynamometer; and we do hereby declare that the following is a full, clear, and exact description of the same, reference being had to the accompanying drawings, forming part of this specification, in which—

Figure 1 is a side view partly in section of our dynamometer. Fig. 2 is a central section of the same.

Similar letters of reference indicate corresponding parts in both figures.

Our improved dynamometer is of that class which is used for measuring the power transmitted by shafting to machinery.

It consists of two pulleys one fast and the other loose upon the same shaft, and the two combined by means of one or more arms and spiral springs, working on one or more concentric arc formed guides in such a manner that by applying a belt to run on one of them from a pulley on the driving shaft and a belt to run from the other one to a pulley on the shaft to be driven, the power may be transmitted through the said spring or springs and by such transmission will produce a greater or less compression thereof, and the amount of this compression indicated upon a scale attached for the purpose to one of the pulleys of the dynamometer will if the velocity of the revolution of the pulley is ascertained enable the power transmitted to be calculated.

The feature which constitutes our invention consists in a peculiar manner of applying the index so that it may indicate the minimum of power transmitted.

To enable others skilled in the art to make and use our invention we will proceed to describe its construction and operation.

A, is the shaft of the dynamometer fitted to work in bearings in a frame B, of convenient form. C, is the fast pulley keyed or otherwise secured to the said shaft, and D, is the loose pulley fitted to turn loosely on the said shaft.

E, E, are two arms attached rigidly to the fast pulley C, near its rim and entering suitable openings $d$, $d$, in the loose pulley D, in which pulley there are provided two fixed arc formed guide bars F, F, which are concentric with the shaft, the said guide bars being attached to the inside of the rim of the pulley D, by elbow pieces $a$, $a'$, or in any other convenient manner. The said arms E, E, have guide blocks $b$, $b$, attached to, or formed upon the ends which enter the loose pulley D, to work upon the guide bars F, F.

G, G, are strong spiral springs coiled around the two guide bars F, F, between the arms E, E, and the elbow piece $a$, of each guide bar in such a manner, that on rotary motion being given to the pulley C, in the direction of the arrow shown in Fig. 1, the arms E, E, will press the springs G, G, against the elbow pieces $a$, $a'$, on the pulley D, and so cause the latter pulley to rotate with C.

H, is an arc formed guide bar secured to the pulley D, by the same elbow pieces $a$, $a'$, by which one of the guide bars F, F, is secured. This bar, like F, F, is concentric with the shaft A, and is nearer to the periphery of the pulley than the bars F, F, and it has formed upon its inner side a series of ratchet notches $e$, $e$.

I, is a sliding collar fitted to slide freely on the bar H, and attached by a light spiral spring $l$, which is coiled around the said bar to the elbow piece $a'$, to which the said bar is secured, the said spring being so constructed as to tend to draw said slide toward the said elbow piece $a'$. The said sliding collar I, has attached to it by a spring pawl $f$, operating in the ratchet notches $e$, $e$, an index piece $g$, which works under a graduated scale $h$, $h$, attached to the edge of the rim of the pulley D.

$j$, is a socket encircling the bar H, and spring $l$, loosely and attached rigidly to the arm E, which is next the said bar.

To use the dynamometer it is arranged in a suitable position relatively to the driving pulley from which the power to be measured is obtained and to the pulley to which it is to be transmitted, and a belt is brought from the driving pulley to the fast pulley C, and another led from the loose pulley D to the pulley to be driven, and the driving pulley set in motion, to drive the pulleys C, and D, in the direction of the arrow shown in Fig. 1. The power being transmitted from the fast pulley C, to the loose one D, by the springs G, G, the said springs will be more or less compressed according as the power is greater or less. In compressing the springs G, G, till they become stiff enough to transmit the whole power required, the pulley C, of course moves relatively to D, and in such movement the socket $j$, pushes the collar I, along the bar H, and the index piece $g$, moving with the said collar and ratchet pawl $f$, is locked, by the pawl stopping in one of the ratchet notches $e, e$, so that the index, when the motion of the pulleys is stopped, will show upon the scale $h, h$, (the latter being properly graduated) the pressure in pounds that has been used to drive the pulley C, and by multiplying this pressure by the velocity of the bars F, F, in feet per minute and dividing by 33,000, the amount of horse power transmitted may be obtained. In order that the force indicated may not be to what is due to a sudden jerk and therefore in excess of the steady force exerted, the index piece $g$, is left projecting beyond the periphery of the pulley so that it may be pressed toward the center of the shaft A, while the pulleys are in motion, and so liberate the pawl $f$, from the ratchet $e, e$, and leave the slide I, which carries the index piece and pawl, free to be drawn back by the spring $l$, to the socket $j$, so that the index may be made to indicate the minimum amount of force as exerted in the steady operation of the machinery.

Instead of applying the power to the pulley C, as described and transmitting it therefrom to D, the operation may be made precisely the reverse by applying the driving belt to the pulley D, and the effect will be the same.

Instead of constructing the dynamometer with the arms E, springs G, and guide bars F, a single arm, spring and guide bar may be used or more than two arms, springs, and guide bars.

In the construction of the instrument the graduation of the scale $h, h$, is effected by securing the pulley C, so that it cannot rotate, and attaching weights to a cord made fast to the pulley D, as shown in blue outline in Fig. 1, marking on the scale the points to which the index is brought by the several weights applied, and dividing the spaces between these points for a more minute graduation if desired.

What we claim as our invention and desire to secure by Letters Patent, is,

Combining the index piece $g$, with the two pulleys C, D, by means of a spring pawl $f$, slide I, arc formed ratchet bar H, spring $l$, and a socket $j$, or other suitable projection from an arm E, the whole applied and operating substantially as herein specified.

ALONZO WARREN.
ELIJAH DAMON, Jr.

Witnesses:
H. Ware,
J. Andrew Henshaw.